United States Patent [19]
Bruner et al.

[11] 3,747,068
[45] July 17, 1973

[54] REMOTE METER READING SYSTEM FOR KWH WATTHOUR METERS AND DEMAND METERS

[75] Inventors: James N. Bruner; Dan McAuliff, both of Springfield, Ill.

[73] Assignee: Sangamo Electric Company, Springfield, Ill.

[22] Filed: Nov. 4, 1971

[21] Appl. No.: 195,695

[52] U.S. Cl............. 340/151, 235/151.31, 324/103
[51] Int. Cl........................................... G01r 11/64
[58] Field of Search............................ 324/116, 103; 340/150, 151; 235/151.31, 151.21

[56] References Cited
UNITED STATES PATENTS
3,502,980  3/1970  Baggott................. 324/103
3,258,692  6/1966  Jacomini et al............. 340/151

Primary Examiner—John W. Caldwell
Assistant Examiner—Robert J. Mooney
Attorney—John A. Dienner, Arthur J. Wagner et al.

[57] ABSTRACT

A remote meter reading system for providing automatic readout by interrogation equipment located remotely from the meters having the capability of providing demand meter reading including the KWH reading and the demand meter reading for billing purposes regardless of the time of readout of the demand meter reading. Word generator generates words for transmission by an associated transponder in response to an interrogation signal from the remote source.

24 Claims, 9 Drawing Figures

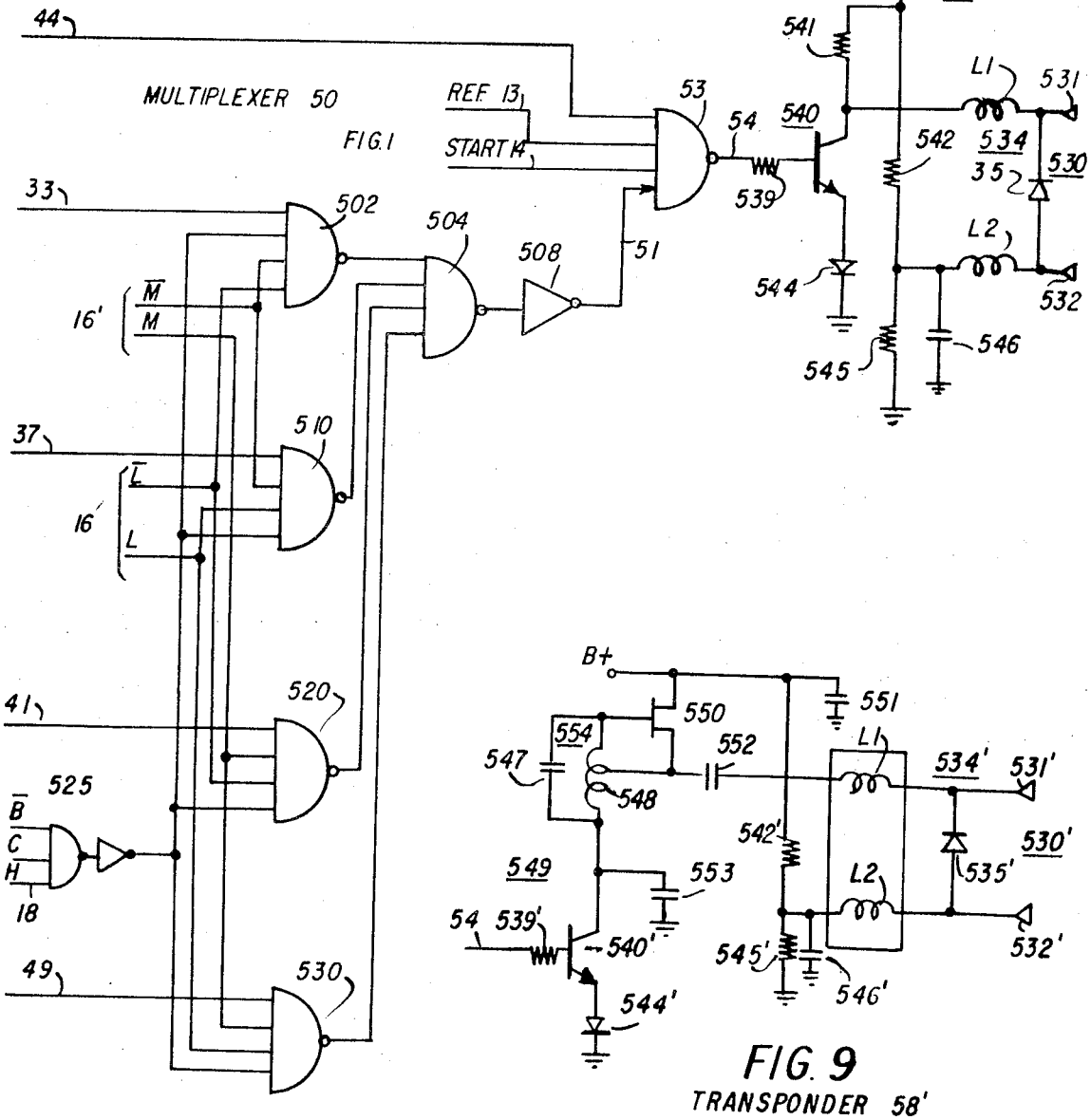
FIG. 7
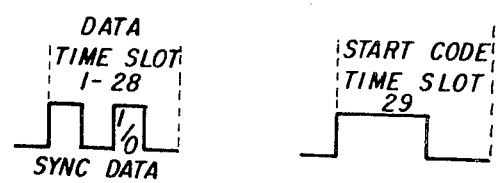
FIG. 8
FIG. 9
TRANSPONDER 58'
INVENTORS
JAMES N. BRUNER
DAN MC AULIFF
BY
ATTYS.

3,747,068

REMOTE METER READING SYSTEM FOR KWH WATTHOUR METERS AND DEMAND METERS

BACKGROUND OF THE INVENTION

1. Field of the Invention

This invention relates to remote meter reading systems, and more particularly to a remote meter reading system in which KWH meters and demand meters may be read from a remote station.

2. Description of the Prior Art

While the utility companies at present generally utilize meter reader personnel for reading the meter information which is provided by the utility meters (i.e., gas, electricity, water and the like), significant strides have been made in recent years in the development of fully automatic meter reading systems. Generally speaking, most remote reading systems basically comprise an encoder device which is attached to the existing meter to sense the meter reading, storage means for storing the sensed reading, and transponder means for selectively transmitting such information over an associated communication link to a central station in response to an interrogation signal from such station. The modes and links used in transferring the information from the individual meters to the central point will vary with the system. In one novel system which is set forth in the copending application, which was filed July 10, 1970, and assigned Ser. No. 53,745, a mobile van unit travels over a predetermined route in a community, and in its travel transmits interrogate signals to the meter equipment at the houses located along such route of travel. The remote meter reading equipment at each house, in response to the interrogating signals, transmits a word which includes an identification number for the meter being interogated and the present reading of such meter. A van receiver means routes the incoming words to van carried storage means for subsequent use in the preparation of the customer's bill.

Other types of systems which have been developed include arrangements in which the telephone line of the subscriber is used as a link with the central station, arrangements in which radio transmitters are attached to the meter to provide wireless transmission of the information to a central point, and arrangements in which the power lines of the subscriber are used as the link between the individual meters and the central station.

While different types of systems are being developed, in each instance the known systems have included transponder equipment which has means for sensing the quantity of the commodity used and means for providing a pulse output indicating the amount of commodity used by the customer. In the case of a transponder used on electrical meters, for example, most systems use a sensor which detects the number of revolutions of the meter disc, and a pulse generator which provides pulses to indicate the number of such revolutions, and thereby the electricity which has been used by such customer. Such reading as obtained by the remote meter reading system or by a meter reader is known in the field as KWH reading.

In a number of locations, the utility finds it necessary to charge the customer at a rate which is determined by the maximum amount of electricity which is used in a given period. In such instances, a meter, conventionally designated as a demand meter, is employed to provide the kilowatt hour (KWH) reading for a given billing period along with the maximum demand which has occurred during a given interval in the same billing period. A demand meter will therefore include, in addition to the conventional register which indicates the kilowatt hours used, a pointer which is advanced along an indicating scale to indicate the maximum reading for each time period in a billing period (15 minute intervals are frequently used as the periods for measuring demand consumption). If the amount of electricity used for a 15 minute period is less than the maximum amount used in a previous period, the indicator will not be moved from its earlier position, and the pusher member for the pointer will be restored to zero position to reinitiate measurement of the electricity used in the further period. However, if the amount of electricity used in such 15 minute period is greater than the amount used in any previous 15 minute period, the pusher member will have advanced the pointer to a position which identifies the larger reading and thereafter will be reset to measure a further 15 minute interval.

As presently used, when the meter reader makes his periodic reading of the kilowatt hour reading and the demand reading, the demand meter pointer must be reset to zero so that the measurements for the next billing period may be initiated.

The remote meter reading systems developed to date have apparently been limited to the readout of kilowatt hour readings, and as a result have a somewhat limited application. That is, without the capability of also reading demand meters (which in addition to providing different type reading must also be periodically reset) special meter readers must be sent out to the various locations in the system for the sole purpose of reading the demand meters. The utility of the automatic reading systems developed heretofore is therefore of limited scope, and such systems have provided only a partial solution to the remote meter reading problem.

SUMMARY OF THE INVENTION

It is an object of the present invention to provide a system which effects the novel reliable and efficient remote readout of electrical demand meters.

It is a further object of the present invention to provide a system of the type in which a single meter sensor may be used to provide the information for the normal kilowatt hour reading and the demand meter reading.

To this end the novel system includes a pulse source which provides pulses which indicate the amount of electricity being consumed to an associate counter, whereby the total count at any given Jime can be automatically provided in response to an interrogation signal. It will be apparent that subtracting of the previous count from the current total count will provide an indication of the amount of power (i.e., a KWH reading) used during the intervening interval. The system further comprises a 15 minute demand counter circuit which is connected to the same pulse source to count the number of pulses which occur in each 15 minute interval. Such pulses are fed to a comparator and storage circuit which is enabled at the end of each 15 minute interval to compare the count stored therein with the count which occurred during a previous 15 minute interval. If the new count is less than the stored count no change is made in the stored count, and the 15 minute demand counter is reset. If the new 15 minute count is larger than the stored count the new count is placed in storage.

A further timer means measures approximately a 30.4 day (730.5 hours) period and at such time an output signal is provided to control a comparator in the storage circuit to transfer the stored count (i.e., the maximum demand count for the previous month) to one of two accumulators. After such transfer, the storage circuit is reset and the next count for the subsequent 30.4 day period is stored in the second accumulator. As will be shown, the time of readout of the meters in a utility system may vary significantly over a year's period, and it is necessary that the output reading of the demand meter be accurate regardless of the times of such readings.

The counts in the two accumulators and the count in the comparator and storage circuit (three separate counts identified as counts B,C,D) are continually made available along with the storage KWH count to associated word generator circuitry. As will be shown such circuit continually generates and supplies words to an associated transponder for transmission to the remote source in response to receipt of an interrogation signal therefrom.

The word generator source includes a first multiplexer which is connected to provide a series of meter address bits which identify the meter address of the demand meter and a series of identification bits which identify the source of the count information which was included in the word (i.e., the source of counts B, C, D or the KWH count). A second multiplexer means is operative to provide the information bits for each word which represents the value of the counts B, C, D or KWH. For reliability in the present system each word is transmitted five times. In one cycle of the system, therefore, twenty words are generated, the information bits in one set of five words representing the count in the comparator and storage circuit, the information bits in a second set of five words representing the count in one accumulator, the information bits in a third set of five words representing the count in the second accumulator, and the information bits in a fourth set of five words representing the KWH counts stored in the KWH meter.

The system cycles in a continuous manner, continuing to provide such set of words to its associated transponder. The transponder in turn provides such information to the mobile van unit in response to interrogating signals which are received from such unit. The van unit stores such information for processing by associated processing equipment on the van or for use by data processing equipment located in the central station.

BRIEF DESCRIPTION OF THE DRAWINGS

FIG. 7 is a schematic circuit showing of the multiplexer which is utilized to select the information output from the different multiplexers of FIG. 6 for application to the system transponder;

FIG. 8 is a time diagram of the data time slots and start pulse time slots used in the signalling pattern of the systems; and FIG. 9 is a showing of an alternate transponder for use with the system.

GENERAL DESCRIPTION

Figure 1:
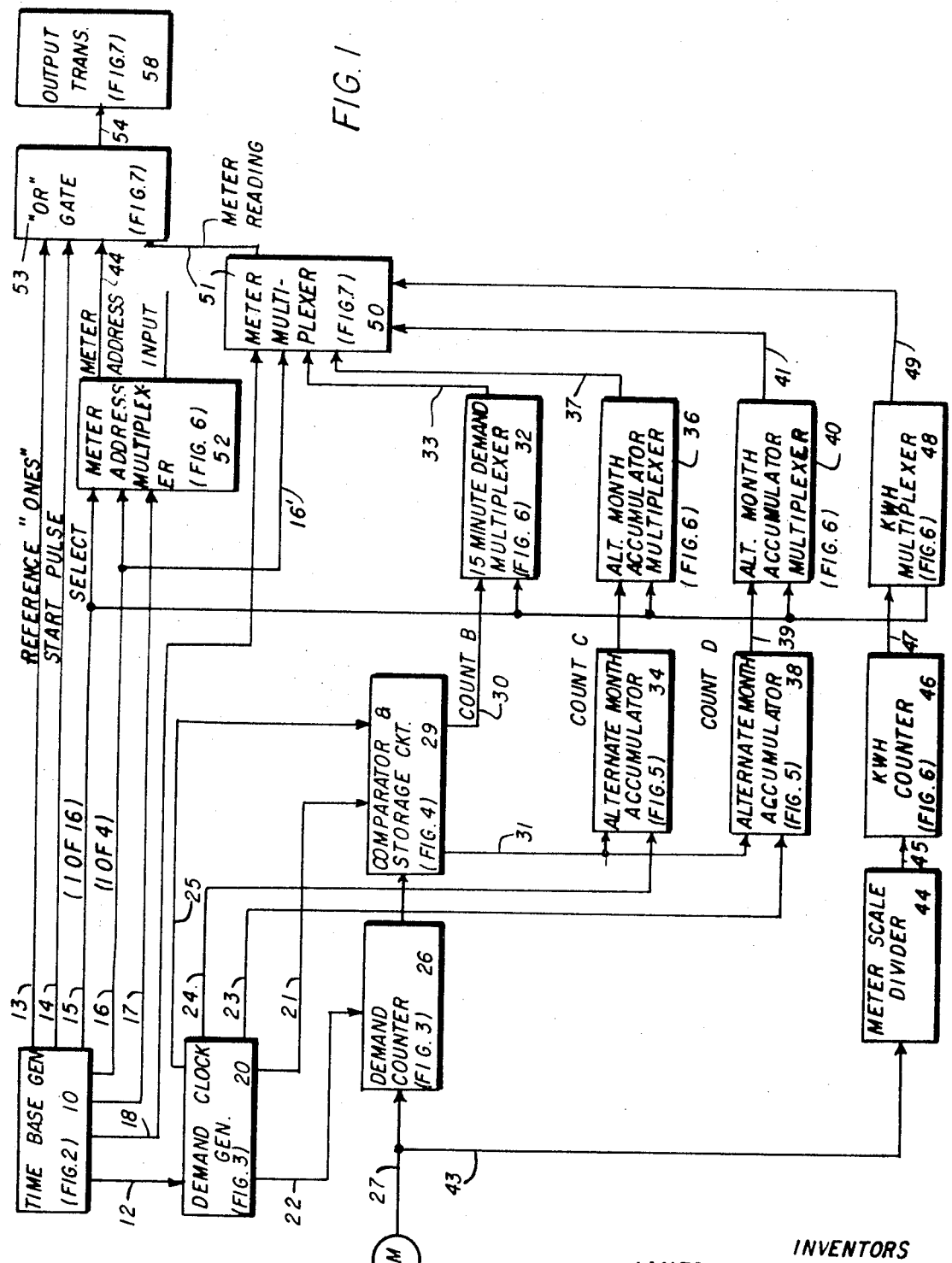
FIG. 1 is a block diagram of the novel system including the circuitry which is used in the generation of words indicating the information provided by the demand meter for use in readout by remotely located interrogating apparatus.

With reference to FIG. 1, there is set forth thereat a block diagram of the novel system which is adapted for use in the automatic readout of demand meters, and particularly of demand meters which are used in the novel remote meter reading system set forth in the above identified copending application. As will be shown, a pulse encoder of the type shown in such application continually provides pulses representing the power measured by the demand meter DM over an input circuit 27 to a demand counter 26 which accumulates a count of such pulses for a measured period. The novel system of FIG. 1 utilizes such information to provide demand reading information to an associated remote meter reading installation.

More specifically with reference to FIG. 1, the system basically comprises a time base generator 10 which generates and provides timing pulses over conductors 12-18 at given time periods in a cyclic pattern to each of a number of circuits in the system in a manner to be set forth.

A first pulse output is fed over conductor 12 at a 3.24 Hz frequency to a demand clock generator 20 which is controlled by such pulses (a) to measure fifteen minute intervals, and (b) to provide an output pulse after each fifteen minute interval over conductor 21 to a comparator and storage circuit 29. With receipt of such pulses at the end of each fifteen minute interval, comparator and storage circuit 29 via path 28 looks at the pulse count accumulated in the demand counter 26, and if the count accumulated by demand counter 26 in the previous fifteen minute period is larger than the count of any previous fifteen minute interval stored in comparator and demand storage circuit 29, the new larger count will be automatically stored in circuit 29.

In addition to the 15 minute interval clocking pulse to effect such evaluation of the demand reading for each fifteen minute interval, demand clock generator 20 also provides a 15 minute delay (or clear) pulse over conductor 22 which is delayed with respect to the clocking pulse on conductor 21 by $1\mu s$. The $1\mu s$ delay permits the comparator storage circuit 29 to make the evaluation described, and as the clear pulse is applied to conductor 22, demand counter 26 is reset to thereby initiate a new count which represents the demand for the next fifteen minute interval.

At the end of each 730.5 hours (approximately 30.4 days) demand clock generator 20 is also operative to provide a transfer pulse alternately over paths 23, 24.

Since the comparator and demand storage circuit 29 continually checks the count for each 15 minute period with the highest previous count, (and makes a change only if a higher 15 minute count has occurred) the count stored in such circuit at the end of 730.5 hours (30.4 days) will clearly represent the largest customer demand in any 15 minute interval for such period. With the receipt of each such transfer pulse, the maximum demand count for the previous 30.4 days which is stored in comparator and storage circuit 29 will be transferred to one of the two monthly accumulator circuits 34 or 38 dependent upon which accumulator has been enabled by the transfer pulse via alternate paths 23, 24.

A brief interval after such monthly transfer, a pulse (referred to hereinafter as a monthly clear pulse) is fed by demand clock generator 20 over conductor 25 to clear the information in comparator and storage circuit 29 and thereby reset such circuit to determine and store the maximum 15 minute interval count which occurs in the next 30.4 days.

In addition to storing and determining the maximum demand information in the manner described above, the novel system is also operative to provide a readout of the total KWH used by the customer and registered on the demand meter DM. More specifically, the input pulses fed over path 27 to demand counter 26 by the demand meter DM are also fed over conductor 43 to a meter scale divider 44 and path 45 to a KWH counter 46. As a result, the total pulse count output from the demand meter DM (which represents total energy measured by the meter from the time of installation of the meter) is thus continually registered on KWH counter 46.

The demand meter information which is stored in the storage circuits 29, 34, 38, and 46 in such manner as cyclically gated out to an associated transponder unit 58 (which may be of the type shown in my copending application or the novel transponder set forth hereinafter) under the control of the time base generator 10.

Digressing briefly, it will be recalled that in my previous system each transmitted word comprises a start pulse and 29 information bits, the 29 information bits being separated by reference signals (logic 1 signals) to provide extremely reliable information readout by the remote unit. To further insure reliable signal readout, each word generated is transmitted five times to the remote interrogating source. The manner of generation of words for use in transmitting the accumulated demand meter information in such system is now briefly described.

With reference once more to FIG. 1 time base generator 10 which includes a 3.840683 megahertz crystal generator (i.e., a frequency output related to that of the system shown in my copending application) provides the reference "1" signal output over path 13 at the 1875.33 Hz rate for interspersing with the information bits in each word which represents the accumulated demand meter information. The start pulse for each word is provided over path 14 by time base generator 10 at a frequency rate of 32.4 Hz and in turn over OR gate 53 and path 54 to the transponder 58.

The word bits representing the meter address and accumulated demand meter information is fed to the same transponder 58 by a group of multiplexers 32, 36, 40, 48, 50 and 52. For such purpose, time base generator 10 further provides a "1 of 16" select pulse over four conductor path 15 to (a) meter address multiplexer 52, (b) 15 minute demand multiplexer 32, (c) alternate month demand accumulator multiplexer 36, (d) alternate month fifteen minute demand accumulator multiplexer 40, and (e) the KWH counter multiplexer 48.

That is, after the start pulse (three logic 1 levels followed by a logic 0 level) is placed on path 14 by time base generator 10 (in time slot 29 of a word), time base generator 10 places the first pulse (0001) on "1 of 16" four conductor path 15 to multiplexers 52, 32, 36, 40, 48. Simultaneously multiplexer 52 will be enabled by a signal on path 17 from time base generator 10. Since multiplexer 52 has its fourteen most significant inputs hardwired with the address preassigned to the demand meter DM, multiplexer 52 will cause such fourteen bits in the meter address to be fed sequentially over path 44 and OR gate 53 to the transponder 58 as the first fourteen input selection signals are successively applied to path 15 by time base generator 10. The 15th and 16th bits output by multiplexer 52 will be determined by the signals on the "1 of 4" meter-select two conductor path 16 (00 in the first instance). As will be shown, the same "1 to 4" signals are fed to meter reading multiplexer 50 which in turn selects the output of a corresponding one of the multiplexers 32, 36, 40 and 48. Since the same bits are used as the 15th and 16th bits in a word following the first 14 address bits, it is apparent that such bits identify the source of the word information (i.e., 00 will represent multiplexer 32; 01 will represent multiplexer 36; 10 will represent multiplexer 40; and 11 will represent multiplexer 48).

As noted above, the "1 of 16" signals output from time base generator 10 over path 15 to multiplexer 52 are simultaneously fed to multiplexers 32, 36, 40, 48, and such multiplexers will be continually cycled (simultaneously with multiplexer 52) to place the information appearing on their respective inputs over their associated output paths 33, 37, 41, 49 to multiplexer 50. However, such information transfer is without effect during the period the meter address portion of the word is provided by multiplexer 52 since during such period multiplexer 50 is disabled.

After the start pulse on path 13 followed by the sixteen bits have been output from the multiplexer 52, time base generator 10 provides an enable signal on path 18 to thereby enable multiplexer 50 (and simultaneously removes the enable signal from path 17 to disable multiplexer 52). Since the code on "1 of 16" path 15 is 0001, multiplexer 50 will be enabled to extend the input on the first input path 33 from 15-minute demand multiplexer 32 over path 51 to OR gate 53 and over path 54 to transponder 58. The output signals provided by time base generator 10 result in the cyclic transmission of such information (the 14 bit meter address, the two identification bits which identify the information as output from the 15-minute demand multiplexer path 51, the 12 bit meter information provided by multiplexer 32 and the start pulse) five successive times. The five repeated transmissions are accomplished by reason of the fact that the "1 of 4" coded select signals on path 16 are not changed by time base generator 10 until each word has been generated five successive times.

After the fifth generation and transmission of such word, the "1 of 4" select signal output on path 16 from time base generator 10 changes from 00 to 01. The time base generator 10, in the manner of previous cycles, once more enables the meter address multiplexer 52 via path 17 and thereafter enables multiplexer 50 via path 18. Since the select signal on path 16 is 01, the multiplexer 50 will now select the bit information output from alternate path multiplexer 36 and input over conductor 37 to multiplexer 50. The word including the meter address, code 01 (to identify the information as output from multiplexer 36) the information from multiplexer 36 and the start pulse is output five successive times, and the time base generator 10 thereupon changes the signal on path 16 to 10. Multiplexers 52 and 50 are thereupon enabled to generate a word which includes the meter address, the identification code 10 for multiplexer 40, the information provided by multiplexer 40 and the start pulse, which word is generated five successive times. After the fifth generation, time base generator 10 changes the signal on path 16 to 11, and multiplexers 52, 50 provide a word including the meter address, identification code 11 for multiplexer 48, the information provided by multiplexer 48 and the start pulse. Again such word is generated five times. The system cyclically generates each of the four different words in such manner, and transmits the same to the transponder 58.

The information output by multiplexers 32, 36 and 40 is read out by associated interrogation equipment in the manner described in detail in the copending application. In one preferred embodiment, such equipment is included on a moving van which transmits interrogate signals to the system associated with the meter words in the system. The information obtained by the receiver equipment on the van is fed to memory equipment for use in calculating the maximum demand reading in a novel manner now set forth.

Briefly stated, the van equipment (which may be of the type shown in the copending application) may include storage means operative to store the four output words received from the transponder 58 which words include the information provided by multiplexers 32, 36, 40 and 48. The information output for each meter, as thus stored, is compared with the information previously obtained from the same source.

The data processing equipment then determines the change, if any, in the information obtained from the previous interrogation. The kilowatt-hour consumption is determined by the change in the output of multiplexer 48, and the maximum KW demand is determined by an analysis of readings provided by multiplexers 32, 36, and 40.

The use of alternate accumulators 34, 38 provides sufficient data for the calculation of KW demand regardless of whether comparator and storage circuit 29 has been reset zero, one two, or three times since the previous vehicle interrogation. The rules for analysis are as follows:

Rule 1: If the reading output from neither accumulator 34 nor 38 has changed, the reading in storage circuit 29 is used as the maximum KW demand.

Rule 2: If the reading of either accumulator 34 or 38 has changed, but not both, the change is used as the maximum KW demand.

Rule 3: If the reading provided by both accumulators 34, 38 has changed, the larger change is used as the maximum KW demand provided less than 60.9 days have elapsed since the previous interrogation.

Rule 4: In the unlikely event that more than 60.9 days have elapsed, a valid demand reading can still be obtained provided less than 91.3 days have elapsed. The readings of both accumulators 34 and 38 will have changed at least once, but one of them may have changed possibly more than once. In such event either the smaller change is used for maximum KW demand, or the reading on storage circuit 29 is used if such reading happens to be greater.

In a typical example (and for purposes of simlicity assuming a new installation), if a maximum demand of 120 KW is obtained in the first 30.4 days, it will be seen that storage circuit 29 will have a pulse count which represents 120 KW, and accumulator 34, 38 will still read zero.

Assuming 80 KW was the maximum demand used during the next 30.4 day period, the pulse count on storage circuit 29 will represent 80 KW, and the pulse count on accumulator 34 will represent 120 KW. Accumulator 38 will still read zero.

Assuming that a further 30.4 day period now occurs and that the maximum demand is 90 KW, the readings on storage circuit 29 will be 90 KW; the readings on accumulator 34 will be 120 KW (i.e., such reading information changes every second month) and the reading on accumulator 38 will be 80 KW. It will be seen that the reading on accumulator 38 has changed, but the reading on accumulator 34 has not changed.

Assuming now that the fourth period of 30.4 days has occurred, and that the reading on storage circuit 29 for the fourth period is 30 KW, the readings on the accumulators 34 and 38 will be 210 KW and 80 KW respectively. The manner in which demand readings are provided will be apparent from the following table:

|  | T1 | T2 | T3 | T4 | T5 |
|---|---|---|---|---|---|
| Vehicle interrogation time | 29 days ↓ | 45 days ↓ | 70 days ↓ | 100 days ↓ | 125 days ↓ |
| Reset time | 30.4 days | 60.9 days | 91.3 days | 121.8 days | |
| | KW reading | KW reading | KW reading | KW reading | |
| | Before / After | Before / After | Before / After | Before / After | |
| Storage cir. 29 | 120 / 0 | 80 / 0 | 90 / 0 | 30 / 0 | |
| Accumulator 34 | 0 / 120 | 120 / 120 | 120 / 210 | 210 / 210 | |
| Accumulator 38 | 0 / 0 | 0 / 80 | 80 / 80 | 80 / 110 | |

It will be seen from such table that if the meter DM has been interrogated in less than 30.4 days (Time T1) or between 30.4 and 60.9 days (Time T2), and using Rules 1 and 2 set forth above, the correct reading in each case would have been 120 KW. Although unlikely, if the first interrogation had been made between 60.9 days and 91.3 days (Time T3), the probable reading of 90 KW on storage circuit 29 would have been used, (Rule 4); i.e., 90 KW, the reading on storage circuit 29, is larger than 80 KW, which is the smaller change on accumulator 34 or 38). If the actual demand between 60.9 days and 91.3 days had not reached 90 KW, then 80 KW would have been used as the demand reading.

As another example, if the first interrogation was made at T2 and a second interrogation at T4, the second month's demand reading would be recorded as 90 KW (the larger change—Rule 3). If the second month's interrogation had been at T5 instead of T4, the demand reading would also be 90 KW (the smaller change—Rule 4).

It is apparent that the values of the KW demand readings can vary depending upon the time which elapses between interrogations, but this is also true of present manual reset methods on conventional demand meters. Since most loads tend to be repetitive from month to month, the actual time of manual reset or for interrogation by the present equipment is not considered to be critical.

Time Base Generator

Figure 2:
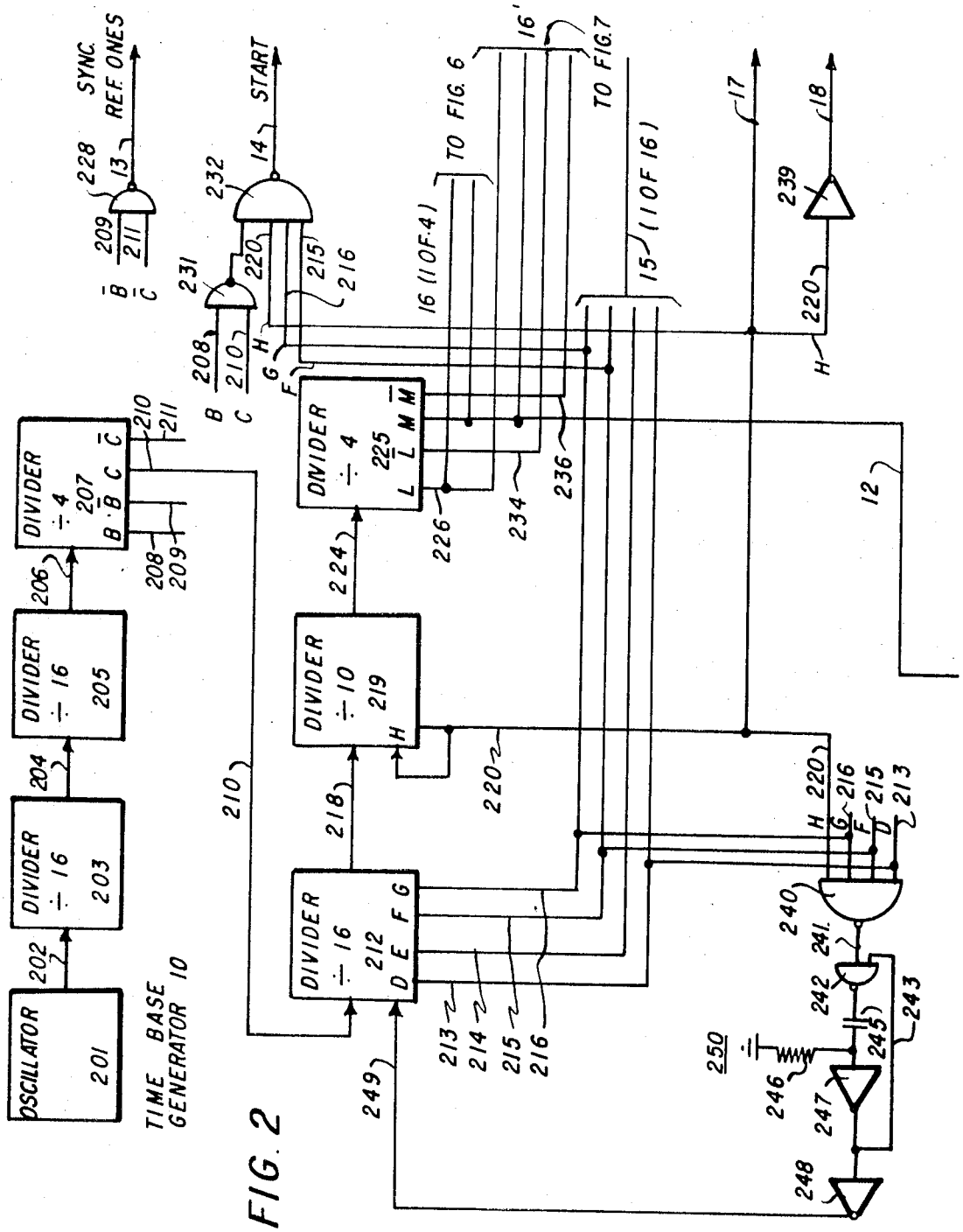
FIG. 2 is a schematic circuit showing of the time base generator which is used to provide the timing signals to the word generation circuitry in the system.

With reference now to FIG. 2, there is shown thereat a time base generator 10 which may be utilized to provide the desired synchronization of operation of the various components of the system. As there shown, a crystal oscillator 201 is operative to provide a 1.920341 megahertz output over path 202 to ÷ 16 divider 203 which in turn provides an output over path 204 of 120.221 KHz to ÷ 16 divider 205 which at its output provides a 7501.3 Hz signal over path 206 to ÷ 4 divider 207. Chips 201, 203, 205, 207 may respectively comprise one-half SN74L00N, SN74L93N, SN74L93N and SN74L73N which are currently available from Texas Instruments Company, Dallas, Tex. The output of divider 207 is provided over outputs 208, 209, 210, 211 respectively as now described in more detail.

More specifically, output path 210 (C) comprises a 1875.33 Hz output over path 210 to a further ÷ 16 divider 212 which has one of its outputs connected over path 218 to ÷ 10 divider 219, and ÷ 10 divider 219 has its output connected over path 224 to ÷ 4 divider 225.

Divider 212 has four additional outputs 213-216 which provide the pulses on the "1 of 16" select path 15, as will be shown. Divider 219 has its ÷ 2 output 220 connected back to the input of the ÷ 5 section to provide a ÷ 10 function over path 224 to ÷ 4 divider 225. The BC outputs of divider 207, the FG outputs of divider 212 and the H output of divider 219 are connected to gate 232 to provide the start signal over path 14. the outputs of divider 225 are connected to provide the "1 of 4" select signal over paths 16, 16'. The ÷ 2 output of divider 219 is also connected over path 17 and via inverter 239 to output path 18 as will now be more fully set forth.

In more detail, it will be recalled that each word comprises 29 time slots. Time slots 1-28 have a sync signal (reference 1) and a data bit and time slot 29 has a start pulse comprised of two logic 1 signals and a logic 0 signal. The information bits for the first 16 time slots comprise a meter address of 14 bits plus 2 code bits indicating the source of the demand meter information and 12 bits of demand meter information (the information bits being separated by reference 1 bits) or a total of 28 information bits. In order to establish a 29 bit pattern for the system, a decode gate 240 (FIG. 2) has its input connected to the outputs DFG of divider 212 and ÷ 2 output of divider 219. As a result with the count of 29 pulses of the 1875.33 Hz input, each of the inputs to gate 240 will be logic 1 and gate 240 will provide a signal output to enable the associated circuitry to provide a reset pulse over path 249 to divider 212 whereby a further count of 29 pulses is initiated.

More specifically, the output of AND gate 240 is connected over path 241 to a one shot multivibrator 250 which provides an elongated pulse to insure proper clearing of the divider 212. Normally, the output of NAND gate 240 is logic 1. As the output goes to 0 logic (i.e., each time a count of 29 is recorded by divider 212, 219) the output of NAND gate 242 goes to logic 1, the input to inverter 247 becomes logic 1, and the output of inverter 247 becomes logic 0. Such output over path 243 to the second input of NAND gate 242 locks gate 242 until capacitor 245 discharges over resistance 246. In one embodiment the values of RC 245, 246 were chosen to provide a 1μs pulse output, it being apparent that the value of such R and C can be selected to provide pulses of different lengths. The 1μs pulse provided in this example is fed over inverter 248 and path 249 to the reset input of divider 212 to start a subsequent count of 29 pulses.

As noted above, time base generator 10 provides further time pulses to the system via paths 12-18 which are synchronized with and related to the 29 bit word framework described above.

It will be initially recalled that in the system of the copending application, sync pulses (reference one pulses) are generated between each data bit output from the transponder 58. Such pulses are derived in the time base generator 10 by NAND gate 228 which has its inputs connected over conductors 209, 211 to the $\overline{B}, \overline{C}$ output of divider 207 to provide sync pulses at the 7501.3Hz rate over path 13 to the OR gate 53 and transponder 58 (FIG. 1). Since such pulses occur in the sync portion of each time slot of each word no further description appears necessary. It will be apparent that divider 207 corresponds to the pulse divider 241 shown in the copending application and that each four counts thereof define a time slot for use with the system of such disclosure.

The time base generator 10 further puts out a start pulse at a frequency of 32.4 Hz (whereby each new word output from the system occurs at a frequency rate of 32.4 Hz) i.e., the time required to generate each word in the system. The start pulse on conductor 14 is generated by NAND gate 231 which has three inputs connected over conductors 215, 216, 220 to outputs F, G, H of dividers 212, 219, whereby such inputs will go to logic 1 each time a count of 29 is output by dividers 212, 219 (i.e., as shown in FIG. 8, the 29th time slot of the system comprises two logic 1 intervals followed by a logic 0 interval). Gate 232 has a further input connected to the output of NAND gate 231 which has its inputs connected to the B, C, outputs of divider 207. As a result the start pulse will occur at time slot 29 and will comprise a sync pulse followed by a logic 0 pulse. The time slots for the stored pulse, sync pulse and data pulse which make up each word are described more fully in the copending application.

The DEFG outputs of divider 212 are connected over conductors 213-216 in path 15 and provide a changing signal (1 of 16 code) for each time slot (i.e., 0000, 0001, etc.). As will be shown the coded signals on path 15 are fed to multiplexers 32, 36, 40, 48 and 52 for use in gating the accumulated data information into the data bit interval of an unexpired time slot in each word.

The ÷ 2 output of divider 219 over conductor 220 to paths 17 and 18 determines the bit information to be provided in each word. Thus the signal on conductor 220 (path 17) will be logic 1 during the first 16 counts from dividers 212 and the meter address to the transponder 58. As the count of divider 212 continues, the output of divider 219 will change to logic 0 and such signal over conductor 220 and inverter 239 will result in logic 1 on path 18 which enables multiplexer 50 to provide the bit information to be transmitted for the next 12 time slots (it being recalled that reset occurs at count 29).

The source of the bit information provided for the 12 time slots is determined by the signals on the "1-of-4" conductors 16,16'.

It will be recalled that divider 219 is comprised of a ÷ 2 and ÷ 5 counter. Thus an output is provided by divider 219 to divider 225 only after each word has been generated five times by the signals on conductors 15, 17, 18. After five signals over conductors 17, 18, respectively, the pulse on path 224 from divider 219 causes the output of divider 225 to advance one count and provide a different select signal over its L,M, $\overline{L}$, $\overline{M}$, outputs and the two conductor paths 16, 16' respectively (i.e., 00, 10, 01, 11 on path 16 and 11, 01, 10, 00 on path 16'). Such signals as applied via path 16' to multiplexer 50 (FIG. 1) enables such multiplexer to successively select the bit output from multiplexers 32, 36, 40, 48 for inclusion in the last 12 bits of each word, a different selection being made after each five word transmission by reason of the changing code on path 16'. The signals on path 16 as fed to multiplexer 52 (FIG. 1) as will be shown identify the one of the sources (32, 36, 40, 48) from which the information is being obtained, such code being placed in the 15th and 16th bits of the 16 bit information provided in each word by multiplexer 50.

Figure 3:
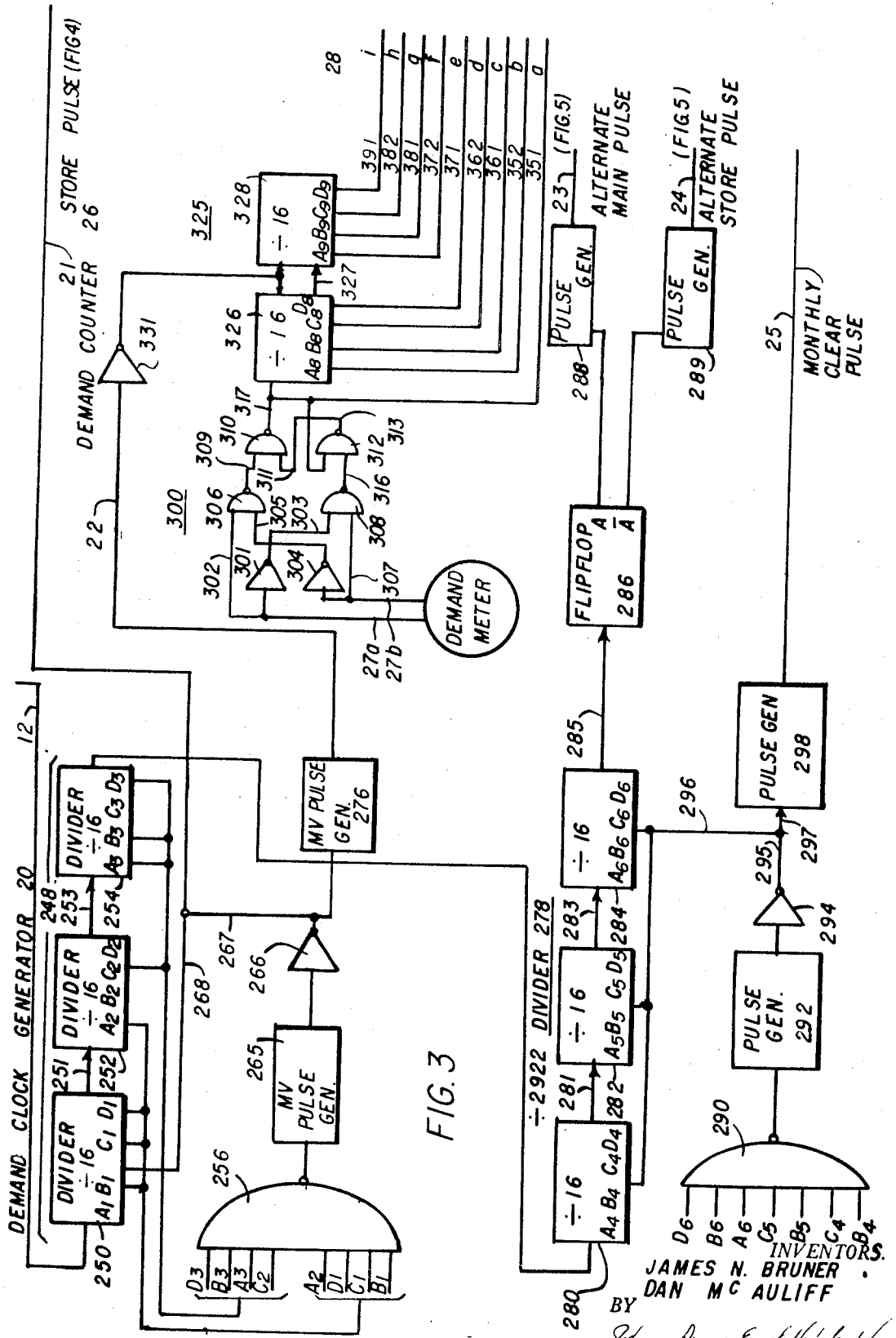
FIG. 3 is a schematic circuit showing of the system demand clock generator and the demand counter.

In addition to providing the timing signals for the word generator described above, the time base generator 10 also provides timing signals which are used to determine the 15 minute intervals of the system operation. That is, the output of divider 225 which occurs at a frequency of 375/116 Hz is fed over path 12 to a demand clock generator 20 (FIGS. 1, 3) to control the same to transfer the counts accumulated in demand counter 216 in each 15 minute interval to the comparator and demand storage circuit 29.

Demand Clock Generator 20

As explained earlier, demand clock generator 20 (FIG. 1) provides a pulse each fifteen minutes over path 21 to transfer the information provided by demand meter DM and accumulated in demand counter 26 to the comparator and storage circuit 29 and a brief interval thereafter a clear pulse over path 22 to circuit 26. In addition, the demand clock generator 20 provides pulses alternately over paths 23, 24 at the end of each 30.4 day period to transfer the information from the comparator and storage circuit 29 to one of the monthly accumulators 34 or 38. A brief interval after such transfer is effected at the end of each 30.4 day period, the demand clock generator 20 provides an output pulse over path 25 to clear the comparator and storage circuit 29 for use in a subsequent period.

More specifically (and with reference to FIG. 3), the input to the demand clock generator 20 from the time base generator 10 comprises a pulse over conductor 12 at the 375/116 Hz rate. Such pulse is fed to the input of a divider chain 248 which is comprised of three ÷ 16 dividers 250, 252 and 254 respectively. The resultant output of divider 254 is a 1/900 Hz signal (i.e., a signal which occurs once every fifteen minutes). In addition, a first count is taken from the D3, B3, A3, C2, A2, D1, C1, B1 outputs of divider chain 248 to NAND gate 256 which thus decodes count 2910 (i.e., when each input to NAND gate 256 is logic 1). As each count of 2910 pulses is effected, a logic 0 pulse to one shot multivibrator 265 (which is the same circuit as 250—FIG. 2) results in a delay pulse over inverter 266. The delay pulse thus provided is fed over conductors 267, 268 to (a) the resets for divider chain 248, and (b) path 21 to the enable input of the comparator and storage circuit 29 (FIG. 4) (i.e., a 15 minute store pulse which enables the comparator and storage circuit 29 to ascertain whether the latest 15 minute count accumulated is greater than any other 15 minute count accumulated in the same 30.4 day period). In addition, the output of inverter 266 is also fed to the input of a further pulse generator 276 which responsively provides an output pulse (15 minute clear pulse) over path 22 which is approximately 1μs to demand counter 26. Such pulse enables demand counter 26 to initiate a new count of pulses output from demand meter DM for a further 15 minute interval.

In addition, the pulse output of divider 248 at the end of each 15 minute interval is fed to a ÷ 2922 divider chain 278 which comprises three ÷ 16 dividers 280, 282, 284 series connected to provide an output over path 285 once each 730.5 hours (which is approximately 30.4 days) to a flip-flop circuit 286. One output A of flip-flop 286 is connected via pulse generator 288 (the same circuit as generator 250—FIG. 2) to path 23 and alternate monthly accumulator 34. Assuming flip-flop 286 changes state at the end of a first 30.4 day period to provide a logic 1 output at terminal A, a pulse is generated by pulse generator 288 and fed over alternate month storage conductor 23 to alternate month accumulator 38.

Figure 4:
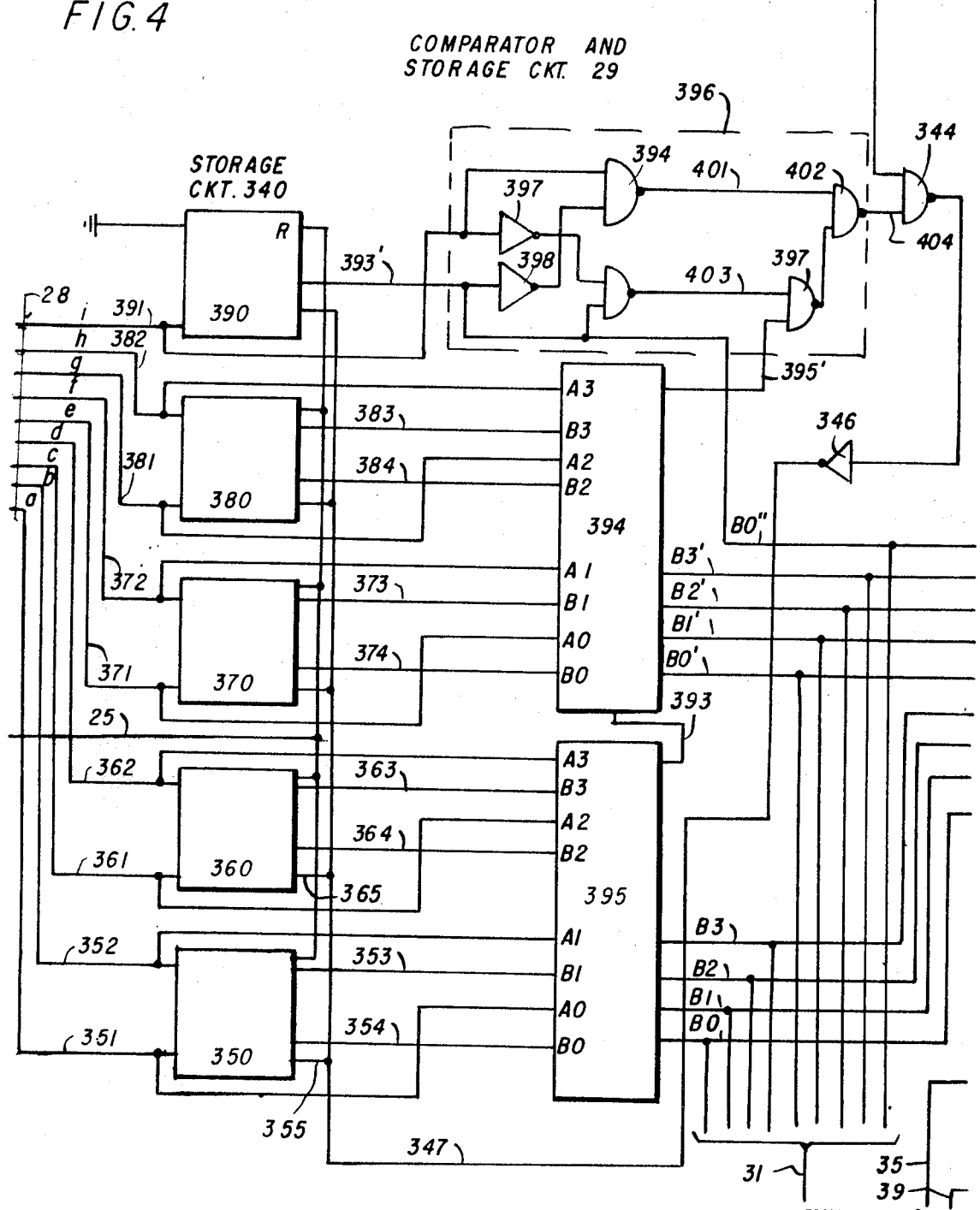
FIG. 4 is a schematic showing of the comparator and storage circuit which stores the maximum count obtained in any 15 minute interval of each 30.4 day period.

After the expiration of the next 30.4 day period, the change of state of the flip-flop 286 effected by divider 278 will provide a logic 1 and $\overline{A}$ terminal and pulse generator 289 (which is the same circuit as pulse generator 150) will provide a storage pulse over alternate month store conductor 24 to the alternate month accumulator 34 (FIG. 4).

The demand clock generator 20 also provides a monthly clear pulse over output conductor 25. The circuitry for generating such pulse includes NAND gate 290 which has its inputs connected to D6, B6, A6, C5, B5, D4, B4 of divider chain 278 whereby logic 1 appears at each input to NAND gate 290 whenever divider 278 advances to count 2922. At such time the output of gate 290 goes to logic 0 and pulse generator 292 (which is the same circuit as pulse generator 150) provides an output pulse over inverter 294, which via path 296 effects clearing of the dividers 280, 282, 284 in chain 278 to thereby initiate the measurement of a further period of 30.4 days.

The output pulse over conductor 295 is also fed over path 297 to a further pulse generator 298 (same circuit as pulse generator 150) which provides a delayed pulse over conductor 25 as a monthly clear pulse to comparator and storage circuit 29 (FIG. 4).

Demand Counter 26

As described in the above identified copending application Ser. No. 53,745, a switch of the type disclosed in the application to Dale F. Becker having Ser. No. 829,160 which was filed May 26, 1969, may be used to provide a pulse output to indicate the number of revolutions of the demand meter disc.

As in the copending application, the switch is connected to provide a change of potential on each conductor of a pair (27a,27b—FIG. 3) as each unit is measured by the sensing device. Thus if there is no potential (logic 1) on both conductors 27a,27b or the potential on both conductors is ground (logic 0), there will be no change in the state of flip-flop 300 which is connected to conductors 27a, 27b. However, whenever conductor 27a is logic 1 and conductor 27b is logic 0, or conductor 27a is logic 0 and conductor 27b is logic 1, the associated flip-flop 300 will provide a pulse over the output 317 to the divider chain 325 which in the illustrated embodiment has the ability to count 4,096 pulses. Such chain comprises two ÷ 16 dividers 326, 328 respectively connected in series, which accumulates the pulses input thereto from the demand meter DM via flip-flop 300 during each fifteen minute interval.

With reference once more to conductors 27a, 27b which feed pulses from the demand meter sensor to the flip-flop circuit 300, it will be seen that the input conductor 27a is connected over inverter 301 to one input of NAND gate 308, and is also connected over path 302 to the first input of NAND gate 306. The second input conductor 27b is connected over inverter 304 and path 305 to the second input of NAND gate 306 and also over path 307 to the second input of NAND gate 308. The output of NAND gate 306 is connected over path 309 to one input of NAND gate 310 and the output of NAND gate 308 is connected over path 316 to one input of NAND gate 312. The output of NAND gate 312 is connected to the second input of NAND gate 310 and the output of NAND gate 310 os connected over path 317 to the first input of NAND gate 312 and also to the input for divider chain 325.

As will be shown, a change in the output over conductor 317 to the counter 325 occurs only when the signals on 27a,27b are of different logic, and the logic on both conductors has changed from a previous condition. Thus, if the input on conductor 27a is a logic 1 and the input on conductor 27b is logic 0, and conductor 27a changes to logic 0, there will be no change in the output on conductor 317. However, at such time as the output on conductor 27b changes to logic 1 and the output on conductor 27a is logic 0, an output pulse will appear on conductor 317.

Such mode of operation is basically the result of the output of NAND gate 310 holding the NAND gate 312 against change until both inputs 27a, 27b have changed state to a logic signal different from that which previously appeared thereon.

By way of example, if both 27a and 27b are logic 1, gates 306, 308 each have one input at logic 0 and their outputs are logic 1, and there will be no change in the outputs of gates 310, 312. If both 27a and 27b were logic 0, the same condition exists. If input 27a goes to logic 0 and input 27b goes to logic 1, gate 312 will not change state.

Summarily, a pulse will be output over conductor 317 to counter 325 only if the logic of the conductors 27a, 27b changes from a previous state, such state having been one in which the logic on the two conductors 27a, 27b was different. It will be apparent that logic 1, logic 0 signals may be represented by potentials of two different levels or by signals of two different polarities if desired, in which case the circuitry 300 would be correspondingly modified. Each such pulse is added to the count which is stored therein during measured 15 minute period.

The count on counter 325 which continually represents the energy measured by the meter during each 15 minute period appears continually on the output conductors a–i of path 28 which conductors are connected as inputs to a storage unit in the comparator and storage circuit 29 (FIG. 4).

Comparator and Storage Circuit 29

It will be recalled that while the count being accumulated during each 15 minute interval is always present on conductors a–i of path 28 (FIG. 3), such count is not transferred to storage until a storage pulse is received over conductor 21 from the demand clock generator 20 (FIG. 3) at the end of each 15 minute period.

At such time the storage pulse as applied over path 21 is fed to one input of NAND gate 344 (FIG. 4) in the comparator and storage circuit 29. As will now be shown, gate 344 will be enabled to effect storage of the count on path 28 only if such 15 minute count is larger than the 15 minute count previously stored in storage circuit 340 during the current 30.4 day period.

With reference to FIG. 4, it will be seen that comparator and storage circuit 29 includes a storage circuit 340 comprising five flip-flops 350, 360, 370, 380, 390. Each of the first four flip-flops, such as 350, has two inputs such as 351, 352 connected to a corresponding pair of conductors a, b in path 28 output from the 15 minute counter 325. The last flip-flop 390 has a single input 391 connected to the ninth conductor i which is output from counter 325. Thus the count which appears on the nine conductors output from counter 325 is continually applied to the inputs of flip-flops 350–390.

For purposes of example, it will be assumed that as a result of a previous 15 minute period a count of 122 was stored in storage circuit 340, and that as the next 15 minute pulse is fed over path 21 to comparator and storage circuit 29 the count on path 28 is 125 (i.e., higher than the stored count).

The comparator and storage circuit 29 also includes a comparator stage which includes a first and second comparator 395, 394 (which may be of the type commercially available as SN74L85N), and a separator comparator stage 396. Each comparator 395, 394 has two sections, each section having a set of inputs, such as A0, A1, B0, B1. Two outputs of each flip-flop, such as 350, in the storage circuit 340 are connected to continually apply the signals representative of the last count stored thereon over two associated output conductors, such as 353, 354, to associated ones of the inputs such as B0, B1, of its associated comparator circuits, such as 395. In addition the current count which is continually input over the associated two conductors of path 28 to each flip-flop, such as 350, is also fed over conductors 351, 352 to inputs A1, A0 of the corresponding section of its comparator.

Thus, as will be shown, the first section of comparator 395 will continually compare the count previously stored on flip-flop 350 with the count presently input over conductors 351, 352 from demand counter 26. In like manner the second section of comparator 395 continually compares the count stored in flip-flop 360 with the count currently input over conductors 361, 362 from demand counter 26.

By way of specific example, if the count stored on flip-flops 350, 360 is 5, the B0, B1, B2, B3 inputs to the comparator 395 will be so marked (0101). Assuming the count on the counter 325 is 6 conductors 351, 352, 361, 362 input to the A0, A1, A2, A3 inputs will be 0110. Since the count on the A inputs is larger than the count on the B input, the comparator 395 will provide a logic 1 over conductor 393 to the comparator 394. Briefly stated, a logic 1 signal will be provided by the comparator 395 only if the current count on conductors 351, 352, 361, 362 is the same as or larger than the count stored on the corresponding flip-flop 350, 360.

In a similar manner, if the count on the A0, A1, A2, A3 inputs of comparator 394 is the same as or larger than the count on the B0, B1, B2, B3 inputs, and a logic 1 occurs on input 393, a logic 1 signal will appear on output conductor 395'. Likewise if the input on conductor 391 is the same as or larger than the output on conductor 393 and there is a logic 1 output on conductor 395' from comparator 394, comparator 396 in accordance with known comparator techniques will cause a logic 1 to appear on conductor 404.

Summarily stated whenever the count input on path 28 is larger than the count stored in storage circuit 340, a logic 1 pulse is provided by NAND gate 402 over path 404 as one input to gate 344. Accordingly, as the 15 minute interval pulse is applied over path 21 to the first input of gate 344, gate 344 will be enabled if, and only if, a logic 1 is applied to conductor 404 as a result of the count on path 28 being larger than the count stored on storage circuit 340.

Assuming that the count input on path 28 is larger than stored count at the time of the 15 minute pulse on conductor 21, gate 344 is enabled to provide a logic 0 pulse to inverter 346 which via conductor 347 provides a logic 1 pulse to the "store" inputs such as 355, 365, etc., for the flip-flops 350, 360, etc., to cause such flip-flops to assume a state which represents the larger count which currently appears on path 28.

Such manner of comparison of the count stored on storage circuit 340 with the count on path 28 every 15 minutes is continued for 730.5 hours at which time a clear pulse is provided by demand clock generator 20 over conductor 25 (as noted heretofore) to the reset terminal R for the flip-flop in storage circuit 340.

Figure 5:
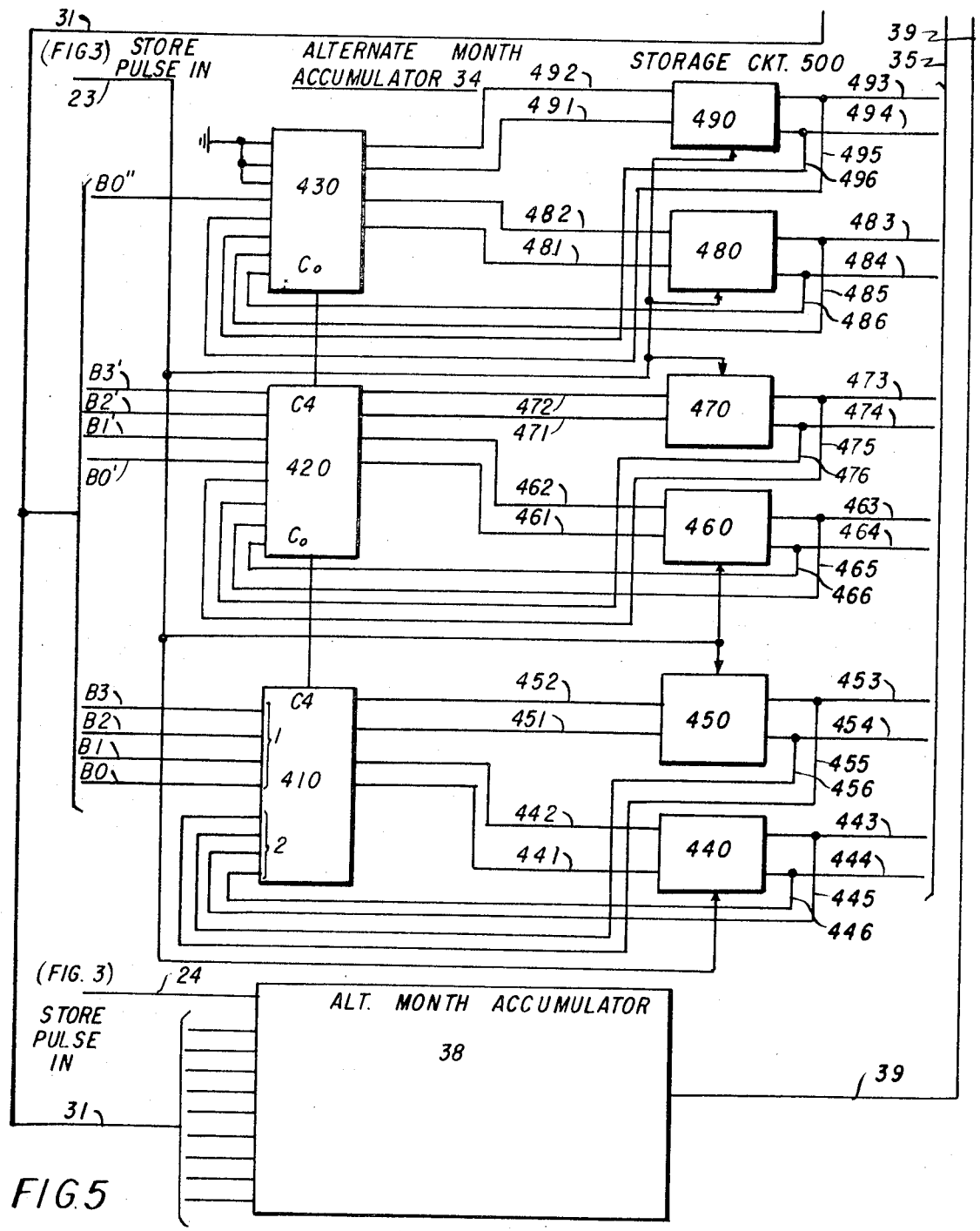
FIG. 5 is a schematic circuit showing of the accumulators which accumulate the maximum counts of demand meter readings for alternate 30.4 day periods.
Figure 6:
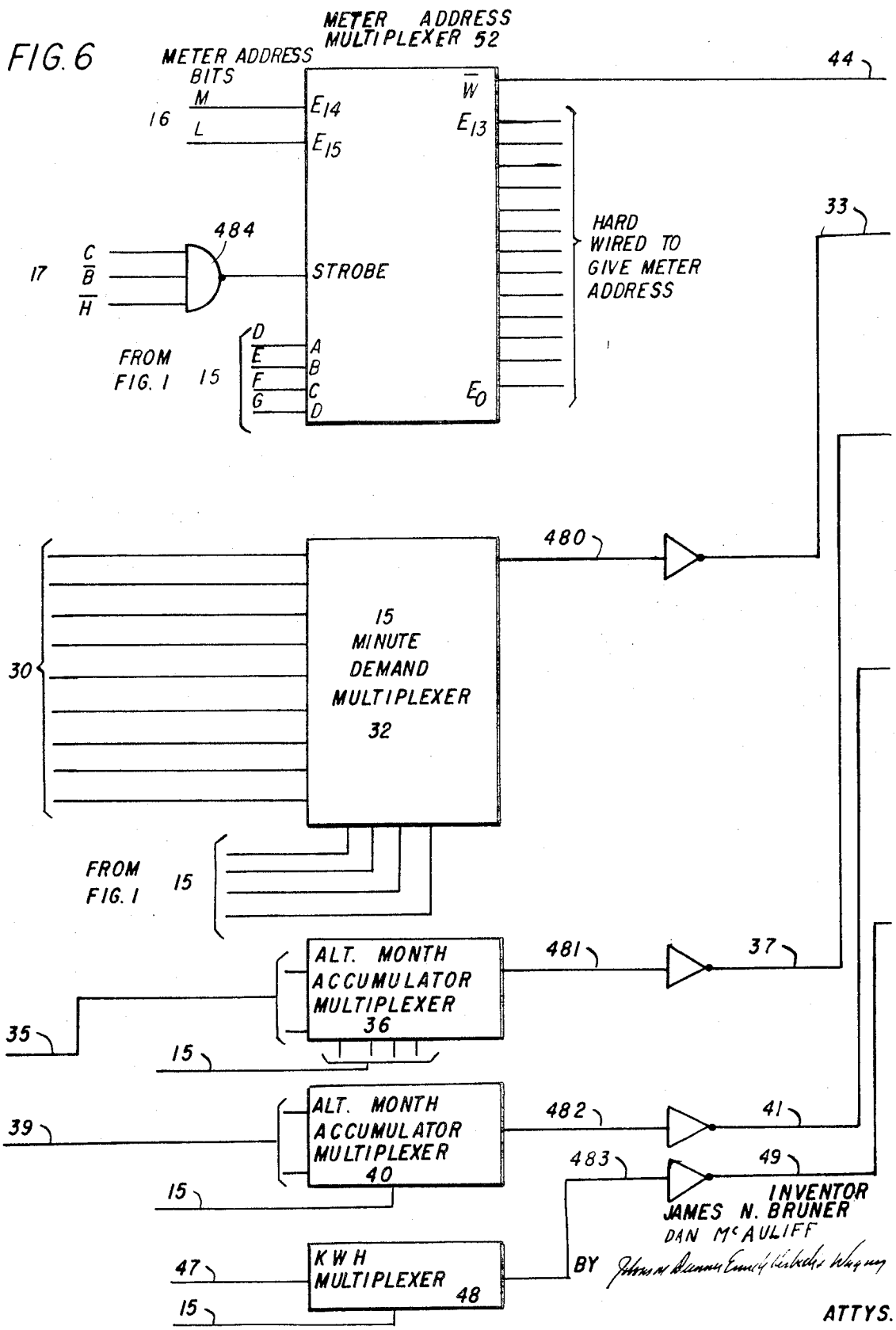
FIG. 6 is a schematic circuit showing of the meter address multiplexer, the 15 minute demand multiplexer, the alternate month accumulator multiplexers, and the KWH multiplexer which are used to provide the information included in the words generated by the system.

The value of the count stored in the storage circuit 340 continually appears over the nine output conductors of path 30 (which are the B0-B3, B0'-B3' inputs and outputs of accumulators 394, 395 and the B0'' output of 396) and are fed over path 30 to the inputs for the 15 minute demand multiplexer 32 (FIGS. 1 and 6). In addition, the same nine conductor output is fed over path 31 as inputs to the alternate month accumulators 34 and 38 respectively (FIG. 5).

Alternate Month Accumulators

With reference to FIG. 5, alternate month accumulator 34 is shown in detail and alternate month accumulator 38 (which is an identical structure) is shown in block.

As noted above, the count stored on storage circuit 340 (and therefore the output from the comparator and storage circuit 29 over path 31) will be the highest reading which occurred in any of the 15 minute intervals in the 730.5 hour interval preceding the monthly transfer pulse.

It will be further recalled that the transfer pulse which is provided by time base generator 10 over conductor 23 to the accumulator 38 and the transfer pulse which is provided over conductor 24 to accumulator 34 occur at alternate 730.5 hour intervals. Assuming that both accumulators 34, 38 are empty at the end of the first 730.5 hour period, the transfer pulse over conductor 24 will cause the highest demand value which has been accumulated in any 15 minute interval of the first 730.5 hours (and which is stored in the storage circuit 340) to be transferred over path 31 to the alternate month accumulator 34.

As shown in FIG. 5 each accumulator comprises a full adder circuit which includes three adder circuits 410, 420, 430, (each of which may be of the type SN74L83N which are currently marketed by Texas Instruments). It will be apparent that the count which appears on input path 31 (and which is always the maximum count stored by storage circuit 340) is continually extended by each adder, such as 410, over its output conductors, such as 441, 442, 451, 452, to a pair of associated flip-flop storage circuits, such as 440, 450, in storage circuit 500. Thus the two bit input on conductor B0, B1 to the first adder 410 will be extended over conductors 441, 442 to the flip-flop 440, and the two-bit input over conductors B2, B3 to adder 410 will be extended over conductor 451 and 452 to the input of a second associated flip-flop 450. Adders 420, 430 are connected in like manner to flip-flops 460, 470 and 480, 490 respectively of storage circuit 500. Storage pulse conductor 23 (which receives a store pulse every 1461 hours) is fed to the set inputs of each of the flip-flops in storage circuit 500.

Assuming for exemplary purposes that a count of 120 was stored in storage circuit 500 as the result of a previous readout, such count will be applied over conductor 445, 446, 455, 456, etc., to the second input set of each of the adders 410, 420, 430. Assuming further that the count input over path 31 to accumulator 34 is 120 at the time of receipt of the transfer storage pulse on conductor 23, the count 120 input on conductor 31 is added with the count of 120 which appears on conductors 445, 446, etc., and the count of 240 appears on conductors 441, 442 . . . 491,492 for the flip-flop 440 . . . 490 in storage circuit 500 as the transfer or storage pulse is applied to the flip-flops 440 . . . 490 in storage circuit 500.

Summarily, as a store pulse is received over path 23 at the end of each 2 month interval, the count which appears on the input path 31 to the accumulator 34 is added to the count which has been previously stored in storage circuit 500, and the resultant total is stored in storage circuit 500 as the storage pulse occurs.

It will be further seen that at the end of the first month, accumulator 34 will store the maximum 15 minute count for such month in its associated storage circuit 500. Likewise at the end of the second period of 730.5 hours, the transfer pulse on conductor 24 will cause the count on path 31 (which represents the highest demand reading for the second month period) to be stored in accumulator 38. As the store pulse is received over input path 23 at the end of the third period of 730.4 hours, the count stored on storage circuit 500 will be added to the count input over path 31 and stored in storage circuit 500. In a similar manner, the count on path 31 at the end of the fourth such monthly interval will be added to the previous count in accumulator 38 and stored in the corresponding circuits therein.

The counts stored in accumulator 34 are continually fed over 12 conductor path 35 to demand multiplexer 32 (FIGS. 1 and 6) and the count stored in accumulator 38 is continually fed over path 39 to multiplexer 36 (FIGS. 1 and 6). With reference to FIG. 1, it will be seen from the foregoing description that the system continually provides a first count B which is output from comparator and storage circuit 29 over path 30 to a 15 minute demand multiplexer 32, a second count C which is output from the first alternate month accumulator 34 over path 35 to an alternate month multiplexer 36, and a count D which is input from the second alternate month accumulator 38.

As has been explained earlier, if neither count C nor D provided by accumulator 34, 38 has changed since the previous interrogation, count B from the comparator and storage circuit 29 will be the demand reading. It can be shown that this condition will only occur somewhere between zero and 30.4 elapsed days.

If only count C or count D provided by accumulator 34 or 38 respectively has changed, the amount of such change should be used as the demand reading. It can be shown that this condition will only occur somewhere between zero and 60.9 days.

In the event that the outputs of both accumulators 34, 38 have changed, and less than 60.9 days have elapsed, the larger change is used as the demand reading. In the unlikely event that more than 60.9 days have elapsed, the outputs from accumulators 34 and 38 may have changed twice, and demand can be estimated by using the smaller change or half the larger change, whichever is greater.

Multiplexing Information to Output Circuit

The multiplexers 52, 32, 36, 40 (FIG. 6) (which may be SN74150N chips currently available from Texas Instruments) are operative in the manner set forth above to effect the multiplexing of information over an associated OR gate 53 and path 54 to the transponder unit 58 for readout by associated remote reading equipment.

Assuming the start of a new word generation cycle, time base generator 10 (FIG. 1) initially provides logic 1 inputs to C, $\overline{B}$, $\overline{H}$ in path 17 which via gate 48 enables the strobe input of multiplexer 52. As the "1-of-16" signals (0000,0001, etc.,) provided by time base generator 16 are fed over path 15, multiplexer 52 is enabled in known manner to connect the logic signals which are hardwired to inputs E0–E13 serially out over path 44 as the first fourteen data bits of the word being generated, and thereafter the logic signals which appear on inputs E14 and E15 to be fed out over path 44. As explained above, the signals on path 16 comprise the "1-out-of-4" selection signals (00, 10, 01, 11) from time base generator 10 which identify the source of the information which is being included in the word (i.e., multiplexer 32, 36, 40, or 48).

Thus if when the signals on path 16 are 00, the 15th and 16th bits output on path 44 will be 0, 0 respectively and as will be shown, the information from the next twelve bits will be obtained from multiplexer 32. Select signal 10 on path 16 identifies multiplexer 36, signal 01 on path 16 identifies multiplexer 40, and select signal 11 on path 16 identifies multiplexer 48.

With reference once more to the word generation, as the first 16 bits have been provided by multiplexer 52 over conductor 44, the time base generator 10 provides an enable signal over conductor 18 to enable the meter reading multiplexer 50 (FIG. 7) to selectively transmit 12 additional bits of information which are obtained from the one of the multiplexers 32, 36, 40 and 48 which has been identified by the select signal (logic 11 is applied successively to conductors $\overline{LM}$; $L\overline{M}$; $\overline{L}M$ and LM) on path 16. With receipt of the enabling signals over path 18 (and logic 1 on the $\overline{B}$ $\overline{C}$ inputs which define the data interval of each time slot), gate 525 provides an enabling pulse during the data period of each time slot to gates 502, 510, 520, 530. At this time with signal 11 on conductors $\overline{L}$ $\overline{M}$ in path 16, gate 502 is enabled to transmit the bit information which is continually provided by the fifteen minute demand multiplexer 32 over path 33 to one input of gate 502.

The 12 serial bit signals output from gate 502 are fed over gate 504, inverter 508, path 51, OR gate 53 and path 54 and the input of transponder 58 during the data intervals of time slots 16–28. As the 12th time slot is completed, time base generator 10 provides the start pulse over conductor 14 during the 29th time slot as described above. It will also be understood that the reference one signals are applied over conductor 13 during the sync interval of each time slot so that the information bits in the successive time slots are followed by a reference one signal.

It will be recalled that the select signals on path 16 remain the same for five readouts of the information on path 33. On the other hand the enabling signals over conductors 17 and 18 effect alternate enablement of multiplexers 52 and 50 as each successive word is generated. As a result, the word described above is generated five times which includes the count B output from multiplexer 32.

As the sixth word is generated, the enabling signal on path 16 changes to 01, (the identification code for count C output from monthly accumulator 34) and the signals on conductor $\overline{L}$, $M$ become 01 and gate 502 is disabled.

As the time base generator 10 effects generation of the meter address and the identification bits for the next multiplexer 34, and the enabling signal is provided over path 18 to gate 525 in multiplexer 50, gate 510 will be enabled (i.e., the conductors L $\overline{M}$ have logic 1, 1 thereon) and the bit information which is provided over path 37 to gate 510 will be fed over gate 504, inverter 508, and OR gate 53 to transponder 58. Such cycle continues as before to effect transmission of five words including the information provided by multiplexer 36 to transponder 58.

In a similar manner, five successive words which include the data information provided by multiplexer 40 and five further words which include the data information provided by multiplexer 48 are generated and fed to transponder 58 by selective enablement of gates 520 and 530.

Transponder

Transponder 58 may be of the type set forth in my copending application which as shown in FIG. 7 comprises an antenna 530 having a separate receive section 531 tuned to 915 MHz and having an impedance represented by lumped inductance L1 and a separate transmit section 532 tuned to 1,830 MHz and having an impedance represented by lumped inductance L2. The transmit section 532 and the receive section 531 are interconnected by a semi-passive network 534 having a non-linear impedance characteristic. The non-linear network 534 serves as the terminating impedance for the antenna 530 and basically comprise a variable capacitance diode 535. Such diode is a semi-conductor diode type device, the junction capacitance of which varies inversely with reverse bias to provide a non-linear loading for antenna 530 resulting in distortion of the 915 MHz interrogate signals received over receive section 531 from the mobile van transmitter and thereby generating harmonics of the signal received. The amount of reverse bias applied to diode 535 is varied in accordance with the value of the logic signal provided over path 54 to transistor 540. Transistor 540 is connected across a B+ source in series with resistor 541 and diode 544.

In operation as the mobile van unit transmits the 915 MHz signals in the direction of the meter and such signals are received between the two sections 531, 532 of antenna 530 and impressed across reactor diode 535, the RF interrogate signals in swinging peak-to-peak through each cycle effect a corresponding change in the impedance characteristic of diode 535. As a result harmonics (including the second harmonic 1830 MHz of the received signal) are generated.

The amplitudes of the harmonic signals thus generated are varied in accordance with the bias level signals which are applied to the diode 535 by transistor 540, which in turn is controlled to vary such bias by the bits of the words being supplied over input path 54. Thus logic 1 pulses will provide a signal level of approximately −1 with reverse bias across diode 535, and the RF signals received at the 915 MHz rate will be distorted to provide second harmonic signals (1,830MHz) at a level of approximately 35db. Logic 0 signals (which turn transistor 540 off) will cause a reverse bias of −12 volts to be applied to diode 535 and thereby prevent the generation of harmonics of the interrogate signal to indicate transmission of a logic 0 signal.

In an alternate embodiment transponder 58' may comprise an oscillator circuit 549 which is controlled to provide outputs in accordance with the bits of the words input over path 54.

With reference to FIG. 9, it will be apparent that path 54 is connected over resistance 539' to the base of transistor 540' which is connected as an oscillator 549 which oscillates at a 10 MHz frequency. The emitter of transistor 540' is connected over diode 544' to ground and its collector is connected to a tank circuit 554 which includes capacitor 547 and inductance 548 tuned to oscillate at a 10 megacycle frequency. The tank circuit 554 in turn is connected to the base of a field transistor 550 which has its output connected over coupling capacitor 552 to the receiving section 531' of the antenna 530'. Capacitors 551, 553 are connected as RF bypass condensers. The transmitting section of antenna 530' is connected to voltage divider 542', 545' in the manner of the embodiment of FIG. 7.

In operation, as the mobile van approaches the unit, the interrogating signal of the mobile van is directly coupled to the receiving section 531' of antenna 530'. Oscillator 549 is turned on and off by logic 1, logic 0 bit outputs which are applied over path 54 to the base of transistor 540' (i.e., a logic 1 signal turns on the oscillator 549 and a low level signal turns oscillator 549 off).

As noted in the above idsclosed embodiment, the output signal from the mobile van is a 915 MHz signal. As a logic 1 input on path 54 turns on the oscillator 549, the 10 MHz output over field transistor 550 is fed across diode 535'. Since diode 535' is a non-linear device, the applied 10 MHz signal is mixed with the 915 MHz signal to provide a 915 MHz ($F_c$) + 10 MHz ($F_1$) or a 925 MHz output, and a 915 MHz ($F_c$) − 10 MHz ($F_1$) or a 905 MHz output. Oscillator 549 turns diode 535' on and off at the 10 MHz rate during the period that a logic 1 bit is applied over path 54. During the period a logic 0 bit is applied over such path, the oscillator 549 is turned off, and diode 535' is off.

At the mobile van, the two input signals as received from the vehicle antenna (905 and 925 MHz) are mixed with the 915 MHz signal which was transmitted (the same vehicle antenna being used for transmitting and receiving). As a result of the strong $F_c$ signal (915 MHz) at the mobile van, the resultant output will comprise a weak $F_c + F_1$ (925 MHz) and a weak $F_c − F_1$ (905 MHz) signal. The transmitted signal thus serves as a local oscillator and the difference frequency $F_1$ is amplified, detected and fed to a decoder generator for decoding and storage in the associated storage equipment.

The advantage of such system is that three milliwatts of DC power as applied to the oscillator 549 will result in at least 1 milliwatt output to the diode 535' at the transponder 58'. Such arrangement results in increased range of signal reception. Further, since the frequency transmitted is close to the frequency returned, there is less space loss. That is, space loss is a function of wave length, and at twice the frequency, 6DB more path loss would occur.

In addition, since the output of the embodiment of FIG. 9 is a linear function of the input, an output signal of inward strength is available which permits use of the system in weak signal areas.

By controlling the input to oscillator 549, the efficiency of the oscillator is changed and the maximum output of the return signal is limited. That is, it will always be less than the oscillator output.

Such arrangement simplifies the antenna at the transmitter (and also simplifies the receiver), since the local oscillator is built into the system. Operation of the system at a lower frequency also results in better signal to noise ratio.

We claim:

1. In a remote meter reading system having meters for measuring quantums of a commodity, at least one meter including indicator means for providing signals indicating the total quantum measurement by said one meter for each predetermined interval of a given time period, means for providing a measurement of the total quantum for each interval including first means enabled thereby to store the measurement for an interval whenever such measurement is larger than the maximum measurement for any previous predetermined interval, accumulator means, means for transferring the value of the stored measurement to said accumulator means at the end of a given time period and thereupon clearing the stored measurement from said first means, transponder means for transmitting signals to a remote location, readout means including first means for selectively providing signals representing the value of the measurement stored in said storage means to said transponder means, and second means for selectively providing signals which represent the measurements which are stored in said accumulator means to said transponder means.

2. In a remote meter reading system having meters for measuring quantums of a commodity, at least one meter having means for providing signals indicating the total quantum measurement for each predetermined interval of a given time period, comparison means for comparing the measurement for each interval with the previous maximum measurement in said given time period including storage means for storing the value of the largest measurement of each such comparison, accumulator means, means for transferring the value of the measurement in said storage means to said accumulator means at the end of a given time period and thereupon clearing such measurement from said storage means, transponder means for transmitting signals to a remote location, and readout means including first means for selectively providing signals representing the value of the stored measurement in said storage means to said transponder means, and second means for selectively providing signals which represent the measurements which are stored in said accumulator means to said transponder means.

3. A system as set forth in claim 2 which includes means for enabling said comparison by said comparison means at the end of each predetermined interval of 15 minutes, and in which said means which transfer the value of the measurement in said storage means to said accumulator means are enabled at the end of each given time period of approximately 30.4 days.

4. A system as set forth in claim 2 in which said readout means includes control means for enabling said first and second means to sequentially provide the signals to said transponder means which represent the measurements stored in said storage means and said accumulator means.

5. A system as set forth in claim 4 which includes meter address means for providing meter identification signals, and in which said control means are operative to enable said meter address means to provide said meter address to said transponder means along with said measurements provided by said storage means and said accumulator means.

6. A system as set forth in claim 2 which said accumulator means includes first accumulator means for storing the value of the largest measurement stored in said storage means at the end of a first measured time period, second accumulator means for storing the largest measurement stored in said storage means at the end of a second measured time period.

7. A system as set forth in claim 6 in which said first and second accumulator means each includes means for providing a cumulative total of the measurements provided thereto by said storage means during alternate ones of successive time periods, and the measurement provided to said transponder means by said further means are said cumulative totals.

8. A system as set forth in claim 2 in which said measurements are stored in said storage means and said accumulator means as logic bits, and in which said readout means includes multiplexer means for effecting readout of said logic bits in word form, and means for providing logic bits in each word which represents the meter address.

9. A system as set forth in claim 4 in which said first and second means comprise a first, second and third multiplexer which are simultaneously sampled in a cyclic manner, and in which said readout means includes a further multiplexer for selectively forwarding the output of said first, second and third multiplexers in a predetermined sequence.

10. A system as set forth in claim 9 which includes means for providing signals which represent the total measurement made by said meter at any given time, and in which said further multiplexer selectively extends said output to said transponder with the outputs of said first, second and third multiplexer.

11. A system as set forth in claim 1 which includes separate counter means for providing a cumulative count of the total number of signals provided by said indicator means.

12. In a remote meter reading system having meters for measuring the quantum of a commodity as used, at least one meter including indicator means for providing an input signal which indicates a given measurement by said meter, demand counter means connected to count the input signals for each predetermined interval of a given time period, storage means, comparator circuit means having first input means connected to the output of said demand counter means and second input means connected to the output of said storage means, means connecting the input of said storage means to the output of said demand counter means, and enabling means for enabling said comparator means at the end of each of said intervals to compare the count stored in said storage means with the count provided by said demand counter means, means controlled by said comparator means for enabling said storage means to store the largest of the two counts in each comparison, accumulator means, and means for effecting transfer of the count stored in said storage means to said accumulator means, said accumulator means including an adder circuit having its input connected to the output of said storage means, a further storage means having its input connected to the output of said adder circuit, and means connecting the output of said further storage means to the input of said adder circuit, whereby each new count input to said adder circuit from said storage means is added to the previous total count in said further storage means and the total thereof is fed to said further storage means.

13. A system as set forth in claim 12 which includes a multiplexer circuit connected to the output of said further storage means in said accumulator means, and means for periodically enabling said multiplexer to provide a readout of the accumulated counts stored in the further storage means of said accumulator means.

14. In a remote meter reading system having meters for measuring the quantum of a commodity as used, at least one meter including indicator means for providing an input signal which indicates a given measurement by said meter, demand counter means connected to count the input signals for each predetermined interval of a given time period, storage means, comparator circuit means having first input means connected to the output of said demand counter means and second input means connected to the output of said storage means, means connecting the input of said storage means to the output of said demand counter means, and enabling means for enabling said comparator means at the end of each of said intervals to compare the count stored in said storage means with the count provided by said demand counter means, means controlled by said comparator means for enabling said storage means to store the largest of the two counts in each comparison, a first accumulator, means for enabling said first accumulator to store the count in said storage means after certain ones of said time periods, a second accumulator, means for enabling the second accumulator to store the counts in said storage means at the end of alternate ones of said time periods, a plurality of multiplexer circuits for effecting readout of the counts in said storage means and said first and second accumulators, and selection means for enabling said multiplexer circuits in sequence to provide sequential readout of the counts stored in said storage means and said first and second accumulator means.

15. A system as set forth in claim 14 in which said selection means includes means for providing coded signals to enable said multiplexer circuit, different coded signals being provided to enable a correspondingly different one of said multiplexer circuits, and which includes further means controlled by said coded signals to provide identification signals for the one of said multiplexer circuits which is providing the count.

16. A system as set forth in claim 15 in which said further means includes meter address means for providing a meter identification address for the meter along with the information and identification signals provided for said multiplexer circuit.

17. In a remote meter reading system having station means for selectively requesting meter information from a meter at a remote location, at least one demand meter in said system which includes means for providing signals indicating the maximum reading for each interval of a given time period, means including comparator means for comparing the reading for each interval with the maximum reading previously detected in said given time period, and storage means for storing the value of the largest of the two readings, transponder means, means for transmitting signals representing the maximum reading stored in said storage means to said transponder means, antenna means for said transponder means operative to receive input signals of a first frequency from said station means, nonlinear impedance means connected to said antenna means operative to distort said input signals to generate related harmonic signals, and means for modulating said harmonic signals with said stored signals prior to transmission over said antenna means to said station means.

18. A system as set forth in claim 17 in which said stored signals are stored as first and second signal bits, and in which said means for modulating said harmonic signals includes an oscillator circuit biassed to be turned on and off by said first and second signal bits respectively, and means coupling the output of said oscillator circuit across said nonlinear impedance means.

19. In a remote meter reading system having station means for selectively requesting meter information from a meter at a remote location, at least one meter in said system which includes means for providing signals indicating the reading on said meter, and storage means for storing said reading, transponder means, means for transmitting signal bits of different types to represent said reading stored in said storage means to said transponder means, antenna means for said transponder means operative to receive input signals of a first frequency from said station means, nonlinear impedance means connected to said antenna means operative to distort said input signals to generate related harmonic signals, and means for modulating said harmonic signals with said stored signals prior to transmission over said antenna means to said station means, including an oscillator circuit turned on and off by different ones of said stored signal bits, and means coupling the output of said oscillator circuit across said nonlinear impedance means.

20. A method of remotely reading meters in a multimeter system which comprises the steps of providing signals which indicate the value of the maximum measurement made in each interval of a given time period, storing the maximum reading obtained in the first interval of said time period in associated storage means, comparing the maximum reading obtained in the next interval with the maximum reading stored in the first interval of said given time period, and storing in said storage means the largest reading of the two compared readings, comparing the maximum readings obtained in each further interval of said given time period with the maximum one of the readings previously stored in the storage means, and in each case storing the largest reading of the two readings thus compared, transferring the maximum reading in said storage means at the end of said given time period to an accumulator, and selectively providing the maximum reading in said storage means and the maximum reading in said accumulator for use in a demand reading calculation.

21. A method of remotely reading meters in a multimeter system which comprises the steps of providing a pulse count indicating the value of the maximum measurement made in each interval of a given time period, storing the maximum count obtained in the first interval of said time period in associated storage means, comparing the maximum count obtained in the next interval with the maximum stored count obtained in the first interval of said given time period, storing in said storage means the largest count of the two compared counts, comparing the maximum counts obtained in each further interval of said given time period with the maximum one of the counts previously stored in said storage means, and in each case storing the largest count of the two counts thus compared, transferring the maximum count in said storage means at the end of said given time period to a first accumulator, transferring the maximum count in said storage means at the end of a second time period to a second accumulator, and selectively providing the maximum count in said storage means and the maximum counts in said first and second accumulators for use in a demand reading calculation.

22. A method of remotely reading meters in a multimeter system which comprises the steps of determining the value of the maximum measurement made in each one of a plurality of intervals of a given time period, storing said maximum measurement from a first one of said time periods in a first accumulator, storing the maximum measurement for a second one of said time periods in a second accumulator, and continually providing the largest measurement made in progressive intervals of a third one of said time periods, comparing the output of said storage means in said first and second accumulators with the output at the time of a previous reading and using the reading in said storage means for the billed meter reading whenever the measurement in the first and second accumulator is unchanged from the previous reading.

23. The method of claim 22 which includes the further step whenever one of the accumulators has a reading different than its previous reading of providing the reading of the one of said accumulators which has changed.

24. The method of claim 22 which includes the further step whenever the reading on the first and second accumulator has changed, of providing the change in reading on the one of the accumulators which shows the largest change.

* * * * *